United States Patent
Yanagi

(10) Patent No.: US 9,773,127 B2
(45) Date of Patent: Sep. 26, 2017

(54) INFORMATION PROCESSING APPARATUS

(75) Inventor: Satoru Yanagi, Oobu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 693 days.

(21) Appl. No.: 13/186,951

(22) Filed: Jul. 20, 2011

(65) Prior Publication Data

US 2012/0023560 A1     Jan. 26, 2012

(30) Foreign Application Priority Data

Jul. 22, 2010   (JP) ................................ 2010-164831

(51) Int. Cl.
| | |
|---|---|
| G06F 7/04 | (2006.01) |
| G06F 21/64 | (2013.01) |
| G06F 21/33 | (2013.01) |
| H04L 9/32 | (2006.01) |
| H04L 29/06 | (2006.01) |

(52) U.S. Cl.
CPC ............ G06F 21/645 (2013.01); G06F 21/33 (2013.01); H04L 9/321 (2013.01); H04L 9/3263 (2013.01); *G06F 2221/2151* (2013.01); *H04L 63/0823* (2013.01)

(58) Field of Classification Search
USPC .......................... 726/6, 7; 713/150, 168, 175
See application file for complete search history.

(56) References Cited

U.S. PATENT DOCUMENTS

| | | | |
|---|---|---|---|
| 2007/0219653 A1* | 9/2007 | Martin ............................ | 700/90 |
| 2008/0091464 A1* | 4/2008 | Lipscher et al. .................. | 705/2 |
| 2008/0104401 A1* | 5/2008 | Miyamoto et al. ............ | 713/175 |
| 2009/0319793 A1* | 12/2009 | Zic et al. ....................... | 713/172 |

FOREIGN PATENT DOCUMENTS

WO     WO 2008/050792 A1     5/2008

* cited by examiner

*Primary Examiner* — Kambiz Zand
*Assistant Examiner* — Suman Debnath
(74) *Attorney, Agent, or Firm* — Scully, Scott, Murphy & Presser, PC

(57) ABSTRACT

An information processing apparatus includes: a memory that stores, for each of a plurality of items that can be described in extensions included in a certificate signing request, item names and item contents with associating each of the item names with a respective one of the item contents; an acquiring unit that acquires specific information; a preparation unit that makes out a specific certificate signing request including specific extensions in which a specific item name and a specific item content are described, according to a condition for making out specific extensions which is determined in response to a user's instruction, by acquiring the specific item name and the specific item content from the memory and using the acquired specific information, specific item name and specific item content; and an output unit that outputs the specific certificate signing request to an outside.

22 Claims, 8 Drawing Sheets

FIG. 4

CERTIFICATE SETTING — 140

CERTIFICATE LIST

| CERTIFICATE NAME | ISSUANCE SOURCE | TERM OF VALIDITY | (* EXPIRED TERM) | | |
|---|---|---|---|---|---|
| CertA | CA1 | yyy/mm/dd | DISPLAY | DELETE | EXPORT |
| CertB | CA2 | yyy/mm/dd | DISPLAY | DELETE | EXPORT |
| CertC | CA3 | yyy/mm/dd | DISPLAY | DELETE | EXPORT |
| CertD | CA4 | yyy/mm/dd * | DISPLAY | DELETE | EXPORT |

- PREPARATION OF SELF SIGNING CERTIFICATE
- CSR PREPARATION  ← 142
- INSTALL OF CERTIFICATE
- IMPORT OF CERTIFICATE AND SECRET KEY
- CA CERTIFICATE SETTING

FIG. 5

100 — CSR PREPARATION

- COMMON NAME [ ] — 102a
- ORGANIZATION [ ] — 102b
- DEPARTMENT [ ] — 102c
- CITY [ ] — 102d
- PROVINCE [ ] — 102e
- COUNTRY [ ] — 102f

[ CANCEL ]   [ OK ] — 106

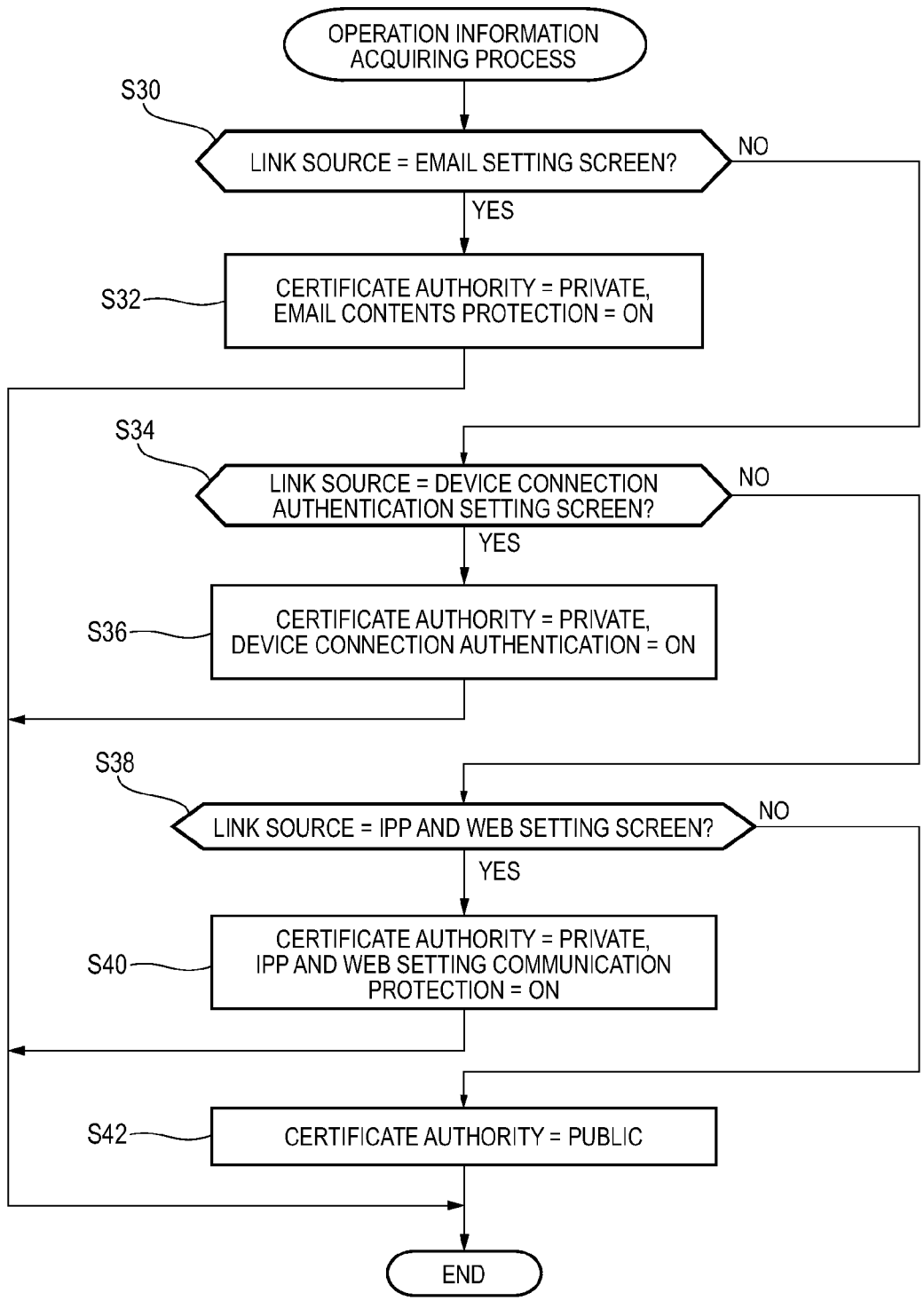

INFORMATION PROCESSING APPARATUS

CROSS-REFERENCE TO RELATED APPLICATIONS

This application claims priority from Japanese Patent Application No. 2010-164831 filed on Jul. 22, 2010, the entire subject matter of which is incorporated herein by reference.

TECHNICAL FIELD

The invention relates to an information processing apparatus that prepares a certificate signing request.

BACKGROUND

There has been proposed a technology relating to an electronic certificate of an x509 format that is used in communication such as SSL (Secure Socket Layer), TLS (Transport Layer Security) and the like. Specifically, the related-art technology discloses a client apparatus that makes out a certificate signing request (CSR) including an extended area (hereinafter referred to as "extensions") in accordance with version 3 of the x509 format. A certificate authority makes out the electronic certificate including the extensions based on the certificate signing request prepared by the client apparatus.

SUMMARY

Illustrative aspects of exemplary embodiments of the present invention provide a technology with which a user can easily enable an information processing apparatus to make out a certificate signing request including extensions in which desired information is described.

BRIEF DESCRIPTION OF THE DRAWINGS

FIG. 4 shows an example of a certificate setting screen;
FIG. 5 shows an example of a CSR preparation screen;
FIG. 6 shows a flow chart of an operation information acquiring process.

DETAILED DESCRIPTION

Figure 1:
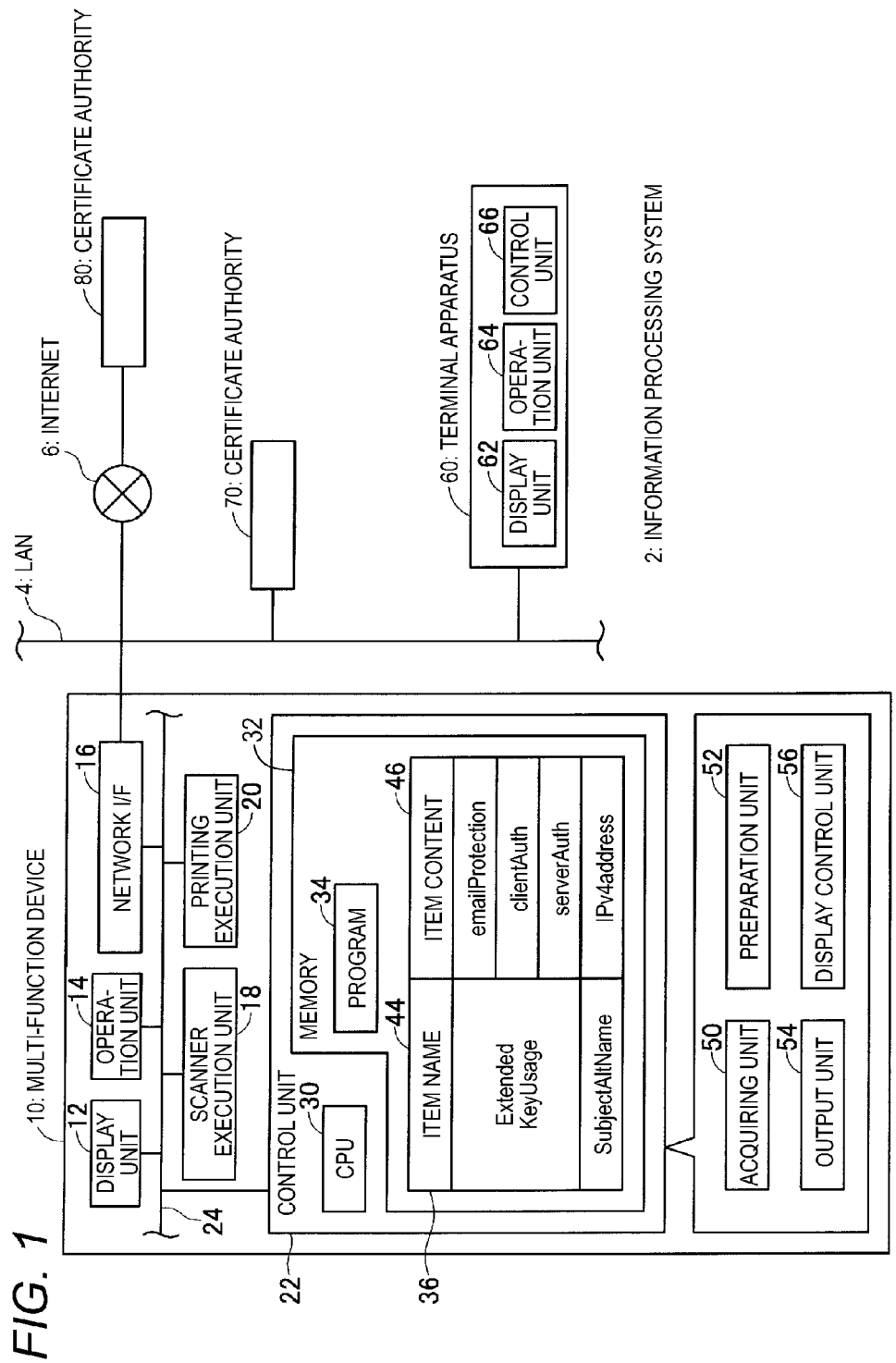
FIG. 1 shows an example of an information processing system according to an exemplary embodiment.

<General Overview>
For a case where a user enables the client apparatus to prepare a CSR, it may be considered a configuration which asks the user to input information that should be described in the CSR including extensions. In this case, it is necessary for the user to input the information, considering a situation in which there exists a certificate authority that cannot make out an electronic certificate based on the CSR including the extensions, for example. In other words, the user is required to have an advanced knowledge of the information that should be described in the extensions.

Therefore, illustrative aspects of exemplary embodiments of the present invention provide a technology with which a user can easily enable an information processing apparatus to make out a certificate signing request including extensions in which desired information is described.

According to one illustrative aspect of the invention, there is provided an information processing apparatus comprising: a memory that is configured to store, for each of a plurality of items that can be described in extensions included in a certificate signing request, item names and item contents with associating each of the item names with a respective one of the item contents; an acquiring unit that is configured to acquire specific information; a preparation unit that is configured to make out a specific certificate signing request including specific extensions in which a specific item name and a specific item content are described, according to a condition for making out the specific extensions which is determined in response to a user's instruction, wherein the preparation unit is configured to: acquire the specific item name of the plurality of item names and the specific item content of the plurality of item contents from the memory; and make out the specific certificate signing request including the specific extensions by using the specific information acquired by the acquiring unit and the specific item name and the specific item content acquired by the preparation unit; and an output unit that is configured to output the specific certificate signing request to an outside.

According thereto, the information about the plurality of items that can be described in the extensions is stored beforehand in the memory. Accordingly, when a user makes an instruction for determining a condition, the information processing apparatus can acquire the information (i.e., a specific item name and a specific item content) relating to the condition from the memory and make out a specific certificate signing request including specific extensions in which the acquired information is described, even though the user does not specifically know the content of the information that can be described in the extensions. Therefore, the user can easily enable the information processing apparatus to make out a certificate signing request including extensions in which desired information is described.

According to another illustrative aspect of the invention, the information processing apparatus further comprises: a display control unit that is configured to display a selection screen including a plurality of selection fields corresponding to the plurality of item contents on a display unit, wherein each of the plurality of selection fields is selected by the user, wherein the preparation unit describes the specific item content, which corresponds to a specific selection field of the plurality of selection fields selected by the user, and the specific item name, which is associated with the specific item content, in the specific extensions.

According thereto, by selecting a specific selection field on the selection screen, the user enables the information processing apparatus to make out a specific certificate signing request including specific extensions in which the desired information is described.

According to still another illustrative aspect of the invention, in the information processing apparatus, the selection screen comprises a plurality of selection field groups including the plurality of selection fields, and wherein according to a result of the user's selection on a first selection field group of the plurality of selection field groups, the display control unit limits the user's selection on a second selection field group of the plurality of selection field groups.

For example, regarding a case where the selection contents are inconsistent with each other when a first selection filed of the first selection field group and a second selection field of the second selection field group are selected at the same time, the selection screen is preferably configured so that the first and second selection fields are not selected at the same time (hereinafter, referred to as 'specific configuration'). According to the information processing apparatus, the specific configuration may be implemented so as to limit a user's selection on the second selection field group according to a result of the user's selection on the first selection field group. In other words, when the user selects the first selection field, it is possible to limit (for example, prohibit) a user's selection on the second selection field, and the user can selectively acquire the information that is described in the extensions from the memory.

According to still another illustrative aspect of the invention, in the information processing apparatus, the display control unit prohibits the user's selection on a part of selection fields included in the second selection field group and permits the user's selection on the other selection fields included in the second selection field group according to the result of the user's selection on the first selection field group.

In addition, the display control unit may prohibit the user's selection on all selection fields included in the second selection field group according to the result of the user's selection on the first selection field group.

According to still another illustrative aspect of the invention, in the information processing apparatus, the display control unit displays one selection screen including the first selection field group and the second field group on the display unit, and wherein the first selection field group is arranged above the second selection field group in the one selection screen.

According thereto, the user can select the first and second selection field groups in one selection screen. Generally, the user sequentially selects the fields from above in the screen. According to this configuration, it is possible to limit the selection on the second selection field group having a possibility of being selected later, according to a result of the selection on the first field group having a possibility of being selected first. Accordingly, for example, it is possible to avoid a user's operation of inputting unnecessary information beforehand, so that it is possible to reduce an input burden of the user.

According to still another illustrative aspect of the invention, in the information processing apparatus, wherein the display control unit is configured to: execute a first display process of displaying the selection screen on the display unit through a setting screen related to a function of the information processing apparatus; and execute a second display process of displaying the selection screen on the display unit without through the setting screen, and wherein when the selection screen is displayed by the first display process, the preparation unit describes the specific item content related to the function and the specific item name associated with the specific item content, in the specific extensions.

According thereto, when the user makes an instruction to display the selection screen through the setting screen, a specific item content and a specific item name, which are related to a function, are described in the specific extensions. Accordingly, it is possible to make out a certificate signing request including the extensions having the necessary information without a re-input operation of the user.

According to still another illustrative aspect of the invention, in the information processing apparatus, the display control unit executes the first display process such that a specific selection field of the plurality of selection fields, which corresponds to the specific item content related to the function, is displayed in a state where the specific selection field has been selected.

According thereto, since the specific selection field is displayed with the selection thereof being completed, the user does not have to re-select the specific selection field. Thus, it is possible to reduce the operation burden of the user.

According to still another illustrative aspect of the invention, in the information processing apparatus, according to the result of the user's selection on the first selection field group, the display control unit prohibits the user's selection on at least a part of selection fields included in the second selection field group, which selection content is inconsistent with a selection content of the first selection field group selected by the user.

Incidentally, a control method for the above-described information processing apparatus, a computer program for the above-described information processing apparatus and a non-transitory computer-readable medium which stores the computer program are also novel and useful.

<Exemplary Embodiments>

Exemplary embodiments of the invention will now be described with reference to the drawings.

(System Configuration)

As shown in FIG. 1, an information processing system 1 includes a LAN 4, an Internet 6, a multi-function device 10 (a peripheral apparatus of a terminal apparatus 60), a terminal apparatus 60 and certificate authorities 70, 80. The multi-function device 10, the terminal apparatus 60 and the certificate authority 70 are connected to the LAN 4. The multi-function device 10, the terminal apparatus 60 and the certificate authority 70 can communicate with each other via the LAN 4. The LAN 4 and the certificate authority 80 are connected to the Internet 6. The terminal apparatus 60 and the certificate authority 80 can communicate with each other via the LAN 4 and the Internet 6.

(Configuration of Multi-Function Device 10)

A configuration of the multi-function device 10 will be described. The multi-function device 10 includes a printing function, a scanner function, a copier function, an IPFAX function, electronic mail transmitting and receiving functions and the like. The multi-function device 10 includes a display unit 12, an operation unit 14, a network interface 16, a scan execution unit 18, a printing execution unit 20 and a control unit 22. The respective units 12 to 22 are connected to a bus line 24. The display unit 12 is a display for displaying a variety of information. The operation unit 14 has a plurality of keys. A user can operate the operation unit 14 to input various instructions to the multi-function device 10. The network interface 16 is connected to the LAN 4. The scan execution unit 18 has a scan mechanism such as CIS, CCD and the like and scans a scan target to generate image data. The printing execution unit 20 has a printing mechanism of an inkjet head manner, a laser manner and the like and performs a printing operation in response to an instruction from the control unit 22. The control unit 22 includes a CPU 30 and a memory 32. The memory 32 stores therein a program 34 and an item table 36. The CPU 30 executes a process in accordance with the program 34 in the memory 32, so that the functions of respective units 50, 52, 54 and 56 are implemented.

The item table 36 stores therein information that can be described in extensions that is included in a certificate signing request (hereinafter, referred to as 'CSR') that is prepared by the multi-function device 10.

The CSR is classified into: a first type CSR including a basic area and extensions; and a second type CSR that includes a basic area but does not include extensions. In the basic area, various information of a certificate user such as common name, organization, department, city, province, country and the like are described. In the extensions, a variety of information such as 'ExtendedKeyUsage= emailProtection', 'SubjectAltName=IPv4addresss' and the like are described. The first type CSR is a CSR for a certificate of version 3 of an x509 format (hereinafter, referred to as 'certificate of x509v3') and includes extensions. The second type CSR is a CSR of x509v3, for example, and does not include extensions. In this exemplary embodiment, the IPv4 address is adopted as an IP address. However, the IP address is not limited to the IPv4 address. For example, an IPv6 address may be adopted.

In the item table 36, among a plurality of items, each item name 44 is associated with respective item content 46. The item name 'ExtendedKeyUsage' is associated with a plurality of item contents, i.e., 'emailProtection', 'clientAuth' and 'serverAuth.' The item contents 'emailProtection', 'clientAuth' and 'serverAuth' indicate 'email protection', 'client authentication' and 'server authentication', respectively. In addition, the item name 'subjectAltName' is associated with one item content 'IPv4address.' The item content 'IPv4address' indicates an IPv4 address that is set (allocated) to the multi-function device 10. In this exemplary embodiment, the item table 36 is stored beforehand in the memory 32 by a vender of the multi-function device 10 before the multi-function device 10 is shipped out. Incidentally, the item content 'IPv4address' is stored in the item table 36 when an IPv4 address is allocated to the multi-function device 10.

(Configuration of Terminal Apparatus 60)

The terminal apparatus 60 is a personal computer and the like, for example. The terminal apparatus 60 is connected to the LAN 4. The terminal apparatus 60 includes a display unit 62, an operation unit 64 and a control unit 66. The display unit 62 is a display for displaying a variety of information. The operation unit 64 includes a keyboard, a mouse, and the like. The control unit 66 includes a CPU and a memory (not shown).

(Configuration of Certificate Authorities 70, 80)

Each of the certificate authorities 70, 80 makes out a certificate in response to the CSR that is prepared by the multi-function device 10. The certificate authority 70 makes out a first certificate including extensions, based on the first type CSR including the extensions. The certificate authority 80 makes out a second certificate not including extensions, based on the second type CSR that does not include the extensions. Incidentally, the certificate authority 70 can make out the second certificate not including the extensions, based on the second type CSR. On the other hand, the certificate authority 80 cannot make out the first certificate including the extensions, based on the first type CSR. In the followings, the certificate authority 70 and the certificate authority 80 are sometimes referred to as 'Private certificate authority 70' and 'Public certificate authority 80', respectively. Here, the Private certificate authority means an authority that can make out a certificate, only based on a CSR that the multi-function device 10 prepares in accordance with an application of the multi-function device 10. The Public certificate authority means an enterprise, a public institution and the like that makes out a certificate.

(Processes Executed by Multi-Function Device 10)

In the followings, processes that are executed by the control unit 22 of the multi-function device 10 will be described with reference to FIGS. 2 to 10. The processes are described based on a flow chart of a main process of FIG. 2.

(First Display Process)

Figure 3:
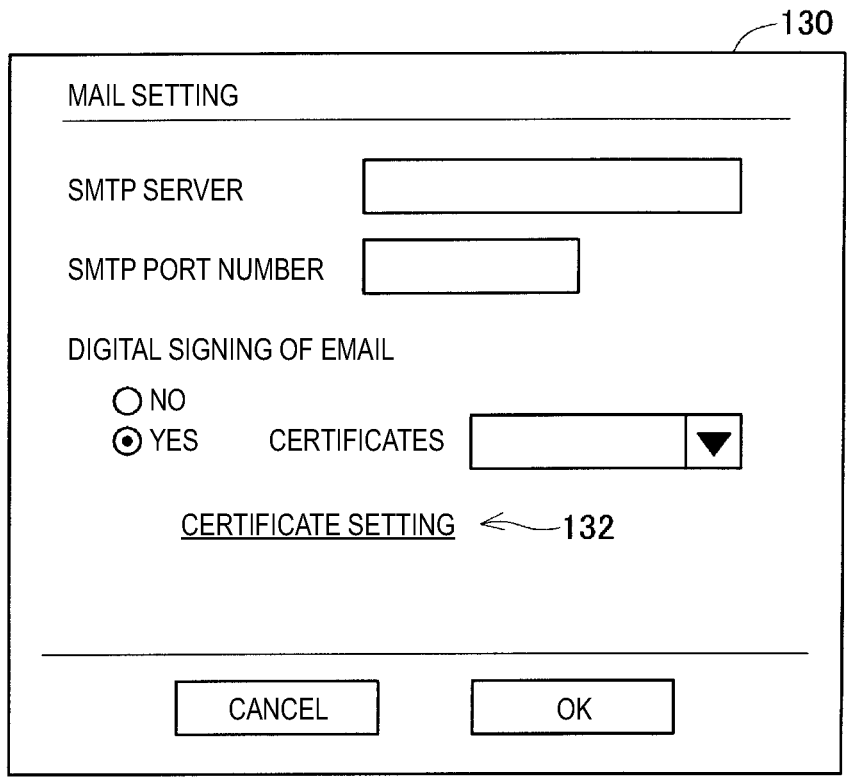
FIG. 3 shows an example of a mail setting screen.

A first display process for displaying a CSR preparation screen 100 (refer to FIG. 5) on the display unit 62 of the terminal apparatus 60 will be described. The multi-function device 10 may serve as a web server. A user uses the operation unit 64 of the terminal apparatus 60 to access the web server of the multi-function device 10. When the user accesses the web server of the multi-function device 10 by using the terminal apparatus 60, the display control unit 56 (refer to FIG. 1) of the multi-function device 10 transmits data, which indicates a main screen (not shown) of the web server, to the terminal apparatus 60. As a result, the control unit 66 of the terminal apparatus 60 displays the main screen on the display unit 62. Then, the user can use the operation unit 64 to perform an operation for displaying a variety of setting screens of the multi-function device 10 in the main screen. For example, the user can perform an operation for displaying a certificate setting screen 140 (refer to FIG. 4). In addition, the user can perform an operation for displaying a setting screen relating to functions of the multi-function device 10 from the main screen. For example, the user performs an operation for displaying a mail setting screen 130 (refer to FIG. 3) relating to settings of email functions of the multi-function device 10. In this case, the control unit 66 of the terminal apparatus 60 transmits a predetermined command to the multi-function device 10. The display control unit 56 (refer to FIG. 1) of the multi-function device 10 transmits data, which indicates the mail setting screen 130, to the terminal apparatus 60 in response to the predetermined command. As a result, the control unit 66 of the terminal apparatus 60 displays the mail setting screen 130 on the display unit 62. The mail setting screen 130 of FIG. 3 is a screen for making various settings relating to an email. The mail setting screen 130 has columns for inputting a variety of information and a hyperlink 132 for displaying the certificate setting screen 140 (refer to FIG. 4). The user can use the operation unit 64 to operate the hyperlink 132, thereby performing an operation for displaying the certificate setting screen 140 (refer to FIG. 4). Accordingly, for example, the user can perform a process for creating a CSR that is required to make out a certificate to be used for a digital signature of an email through the mail setting screen 130 and the certificate setting screen 140.

The setting screen relating to the functions of the multi-function device 10 includes not only the mail setting screen 130 (refer to FIG. 3) but also a device connection authentication setting screen (not shown) for making various settings relating to connection authentication for connecting the multi-function device 10 to the LAN 3, an IPP (Internet Printing Protocol) and Web setting screen (not shown) for making various settings relating to communication with the multi-function device 10 and an external server and the like. All of the device connection authentication setting screen and the IPP and Web setting screen have the same hyperlinks as the hyperlink 132 (refer to FIG. 3).

When the user performs an operation for displaying the certificate setting screen 140 (refer to FIG. 4) (i.e., hyperlink operation) in one of the three setting screens (mail setting screen 130, device connection authentication setting screen and IPP and Web setting screen), the terminal apparatus 60 transmits a predetermined command to the multi-function device 10. The display control unit 56 (refer to FIG. 1) transmits data, which indicates the certificate setting screen 140, to the terminal apparatus 60 in response to the predetermined command. As a result, the terminal apparatus 60 displays the certificate setting screen 140 on the display unit 62. The certificate setting screen 140 of FIG. 4 is a screen for performing a variety of settings relating to the certificate that is stored in the memory 32 of the multi-function device 10. The certificate setting screen 140 has a hyperlink 142 for displaying the CSR preparation screen 100 (refer to FIG. 5). The user can use the operation unit 64 of the terminal apparatus 60 to operate the hyperlink 142, thereby performing an operation for displaying the CSR preparation screen 100 (refer to FIG. 5).

When the user operates the hyperlink 142, the terminal apparatus 60 transmits a predetermined command to the multi-function device 10. The display control unit 56 (refer to FIG. 1) transmits data, which indicates the CSR preparation screen 100, to the terminal apparatus 60 in response to the predetermined command (S2 in FIG. 2). As a result, the terminal apparatus 60 displays the certificate setting screen 100 on the display unit 62. In the followings, a process for displaying the certificate setting screen 140 and then the CSR preparation screen 100 through any one of the three setting screens (mail setting screen 130, device connection authentication setting screen and IPP and Web setting screen) is referred to as a 'first display process.' When the CSR preparation screen 100 is displayed by the first display process, the display control unit 56 stores display hysteresis information, which indicates which of the three setting screens has been displayed, in the memory 32.

As shown in FIG. 5, the CSR preparation screen 100 has input columns 102a to 102f of each information such as common name, organization, city, province and country and an OK button 106. The information that should be input in the input columns 102a to 102f is the basic area information. The user can operate the operation unit 64 to input the basic area information in the input columns 102a to 102f and to operate the OK button 106.

(Second Display Process)

A second display process for displaying the CSR preparation screen 100 (refer to FIG. 5) on the display unit 62 will be described. The user can execute an operation for displaying the certificate setting screen 140 (refer to FIG. 4) in the main screen. In this case, like the first display process, the certificate setting screen 140 is displayed on the display unit 62 without through any of the three setting screens. The user can operate the hyperlink 142. In this case, as described above, the certificate setting screen 100 is displayed on the display unit 62. In the followings, a process for displaying the certificate setting screen 140 and then the CSR preparation screen 100 without through any of the three setting screens is referred to as a 'second display process.' When the CSR preparation screen 100 is displayed by the second display process, the display control unit 56 does not store the display hysteresis information in the memory 32.

When the basic area information is input in the input columns 102a to 102f of the CSR preparation screen 100 (refer to FIG. 5) that is displayed by the first or second display process and the OK button 106 is then operated, the terminal apparatus 60 transmits the basic area information to the multi-function device 10. As a result, an acquiring unit 50 (refer to FIG. 1) acquires the basic area information from the terminal apparatus 60 (S4 in FIG. 2). Then, the display control unit 56 executes an operation information acquiring process (S6 in FIG. 2).

(Operation Information Acquiring Process)

Figure 2:
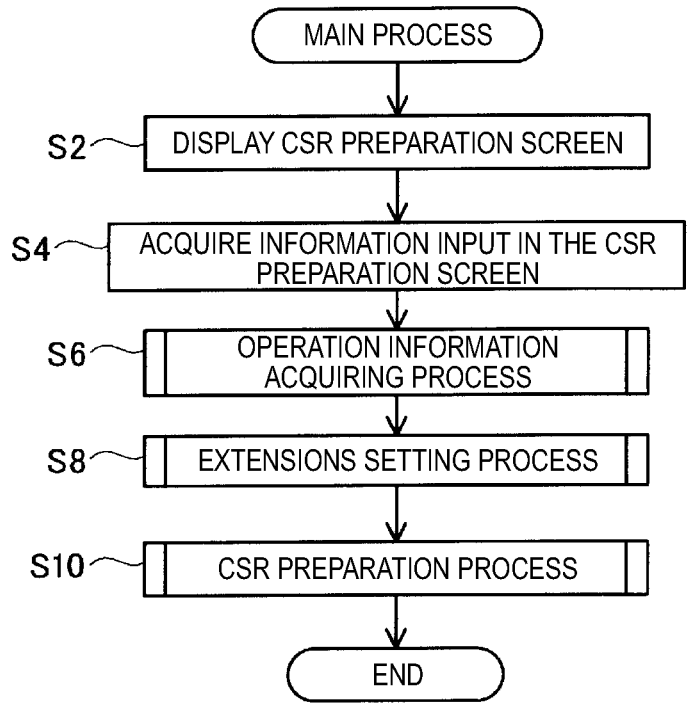
FIG. 2 shows a flow chart of a main process.

The operation information acquiring process of S6 in FIG. 2 will be described with reference to FIG. 6. When the operation information acquiring process starts, the display control unit 56 reads out the display hysteresis information stored in the memory 32. The display control unit 56 determines whether the display hysteresis information is information indicating the display of the mail setting screen 130 (refer to FIG. 3) (S30). When a result of the determination in S30 is YES, the display control unit 56 stores a flag indicating the "certificate authority=Private" and a flag indicating "Email contents protection=ON" in the memory 32 (S32). The flag indicating the "certificate authority=Private" is a flag for selecting a radio button 112a in an extensions setting screen 110 (refer to FIGS. 8 and 9) (which will be described later). In addition, the flag indicating "Email contents protection=ON" is a flag for checking a check box 114a.

When a result of the determination in S30 is NO, the display control unit 56 determines whether the display hysteresis information is information indicating the display of the device connection setting screen (S34). When a result of the determination in S34 is YES, the display control unit 56 stores the flag indicating the "certificate authority=Private" and a flag indicating "device connection authentication=ON" in the memory 32 (S36). The flag indicating "device connection authentication=ON" is a flag for checking a check box 114b (refer to FIGS. 8 and 9).

When a result of the determination in S34 is NO, the display control unit 56 determines whether the display hysteresis information is information indicating the display of the IPP and Web setting screen (S38). When a result of the determination in S38 is YES, the display control unit 56 stores the flag indicating the "certificate authority=Private" and a flag indicating "IPP and Web communication protection=ON" in the memory 32 (S40). The flag indicating "IPP and Web communication protection=ON" is a flag for checking a check box 114d (refer to FIGS. 8 and 9).

When a result of the determination in S38 is NO, i.e., when the display hysteresis information is not stored in the memory 32, specifically, the CSR preparation screen is displayed by the second display process, the display control unit 56 stores a flag indicating "certificate authority=Public" in the memory 32 (S42). The flag indicating "certificate authority=Public" is a flag for selecting a radio button 112b (refer to FIGS. 8 and 9).

When any step of S32, S36, S40 and S42 is completed, the operation information acquiring process is ended. When the operation information acquiring process is ended, the display control unit 56 executes an extensions setting process (S8 in FIG. 2).

(Extensions Setting Process)

The extensions setting process of S8 in FIG. 2 will be described with reference to FIG. 7. When the extensions setting process starts, the display control unit 56 transmits data, which indicates the extensions setting screen 110 shown in FIGS. 8 and 9, to the terminal apparatus 60 (S60 in FIG. 7). As a result, the terminal apparatus 60 displays the extensions setting screen 110 on the display unit 62.

Figure 8:
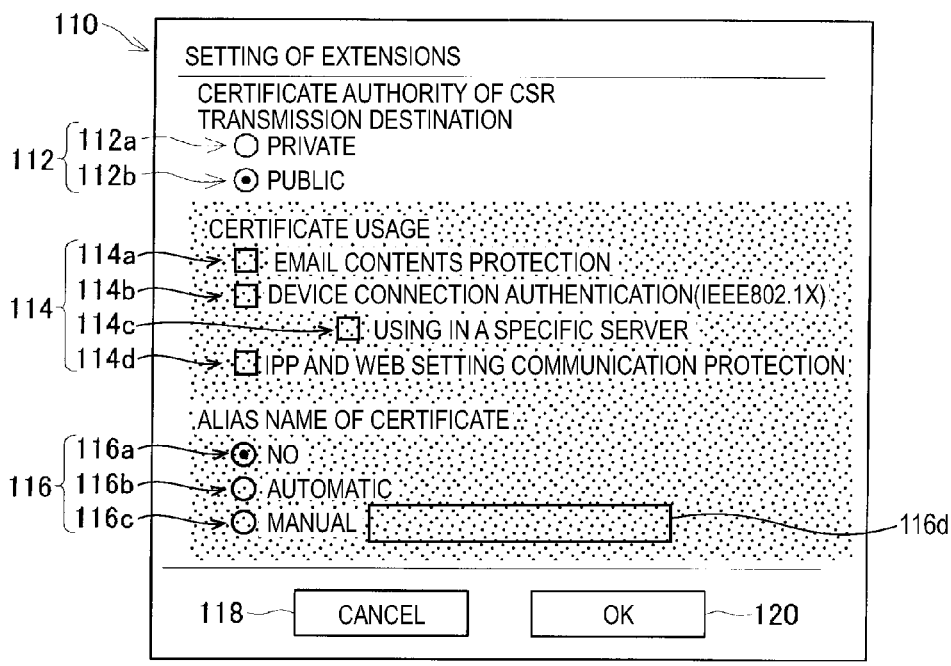
FIG. 8 shows an example of an extensions setting screen.
Figure 9:
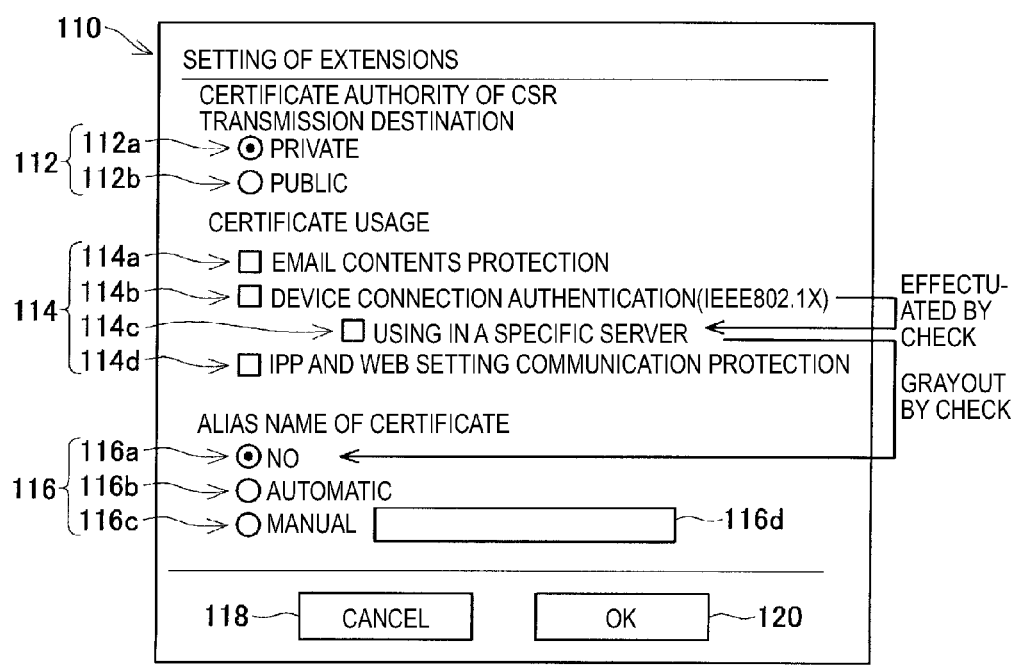
FIG. 9 shows another example of the extensions setting screen.

As shown in FIGS. 8 and 9, the extensions setting screen 110 is a screen for performing a setting relating to information to be described in extensions included in a CSR. The extensions setting screen 110 includes, sequentially from above in the screen, a certificate authority selection unit 112 for selecting a certificate authority of a transmission destination of the CSR, a usage selection unit 114 for selecting a usage (extended key usage) of a certificate, an alias name selection unit 116 for selecting an alias name (subject alternative name) of a certificate, a cancel button 118 and an OK button 120.

The certificate authority selection unit 112 includes a radio button 112a for selecting the Private certificate authority 70 (refer to FIG. 1) and a radio button 112b for selecting the Public certificate authority 80 (refer to FIG. 1). The user can check one of the radio buttons 112a, 112b. When the user checks the radio button 112a, it means that the user selects the Private certificate authority 70 as a certificate authority for preparing a certificate by using a CSR. In other words, it means that the user selects the preparation of the first type CSR. In this case, the control unit 66 of the terminal apparatus 60 transmits the operation information, which indicates that the radio button 112a is checked, to the multi-function device 10. On the other hand, when the user checks the radio button 112b, it means that the user selects the Public certificate authority 80 as a certificate authority for preparing a certificate by using a CSR. In this case, the control unit 66 of the terminal apparatus 60 transmits the operation information, which indicates that the radio button 112b is checked, to the multi-function device 10.

The usage selection unit 114 has a plurality of check boxes 114a to 114d. The check box 114a is a column for selecting, as an item content included in the extensions, the email protection ('emailProtection' in FIG. 1). The check box 114b is a column for selecting, as an item content, the client authentication ('clientAuth' in FIG. 1). The check box 114c is a column for selecting that a certificate will be used in a specific server (for example, a server connected to the LAN 4). The check box 114d is a column for selecting, as an item content, the server authentication ('serverAuth' in FIG. 1). Incidentally, the user can check two or more check boxes 114a to 114d at the same time. When the user checks the check boxes 114a to 114d, the control unit 66 of the terminal apparatus 60 transmits the operation information, which indicates that the check boxes 114a to 114d are checked, to the multi-function device 10.

The alias name selection unit 116 has radio buttons 116a to 116c and an input column 116d. The radio button 116a is a button for selecting that an alias name of a certificate will not be used. The radio button 116b is a button for selecting that an IPv4 address of the multi-function device 10 will be used as an alias name of a certificate. In other words, the radio button 116b is a button for selecting, as an item content, an IPv4 address ('IPv4address' in FIG. 1). The radio button 116c is a button for selecting that a name input in the input column 116d will be used as an alias name of a certificate. The user can check any one of the radio buttons 116a to 116c. Incidentally, compared to the radio buttons 112a, 112b and the check boxes 114a to 114d, even when the check states of the radio buttons 116a to 116c are changed, the control unit 66 of the terminal apparatus 60 does not transmit the operation information to the multi-function device 10. When the user selects the cancel button 118 or OK button 120, the control unit 66 of the terminal apparatus 60 transmits the operation information to the multi-function device 10.

Figure 7A:
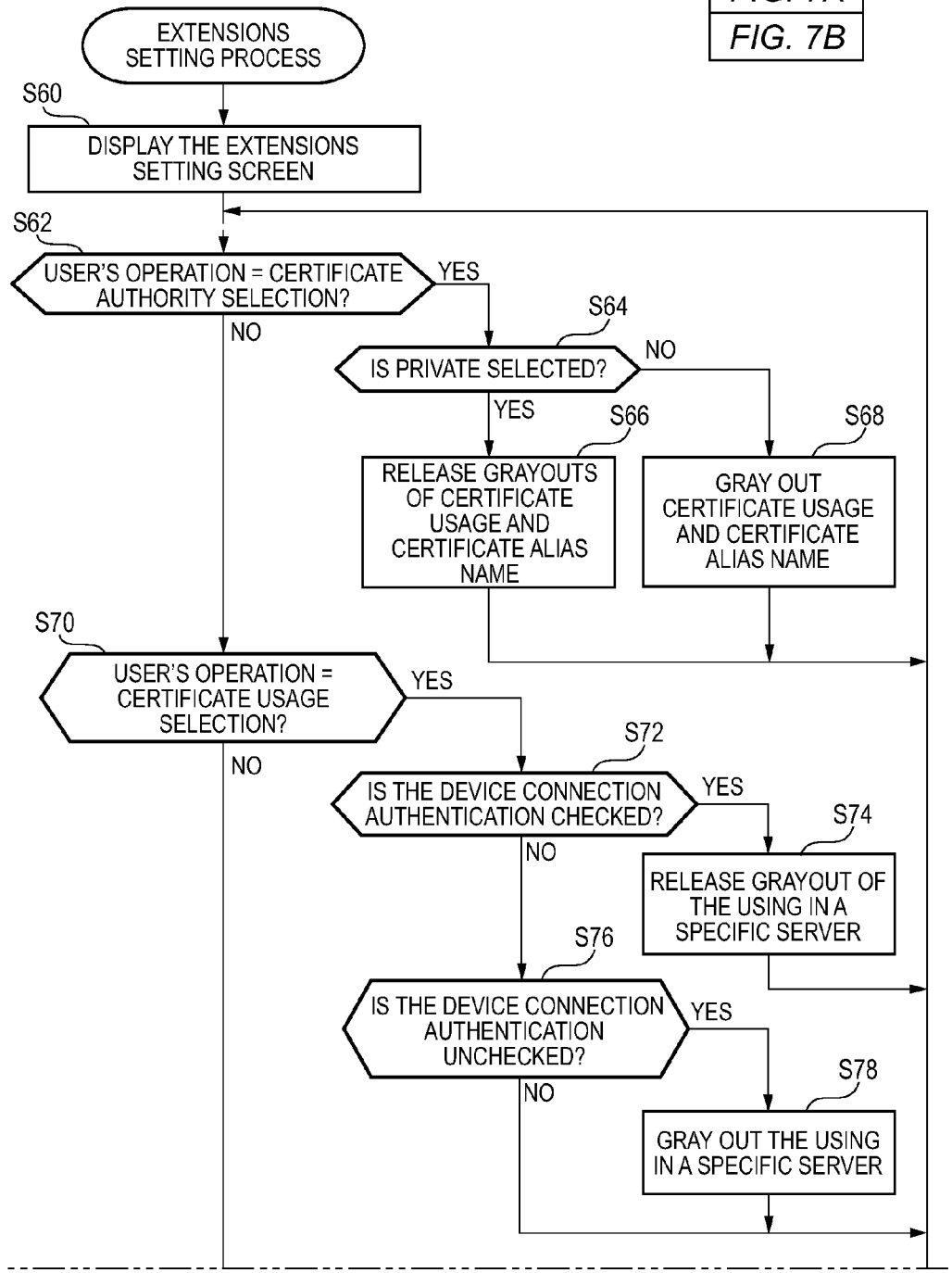
FIGS. 7A-7B show a flow chart of an extensions setting process.
Figure 7B:
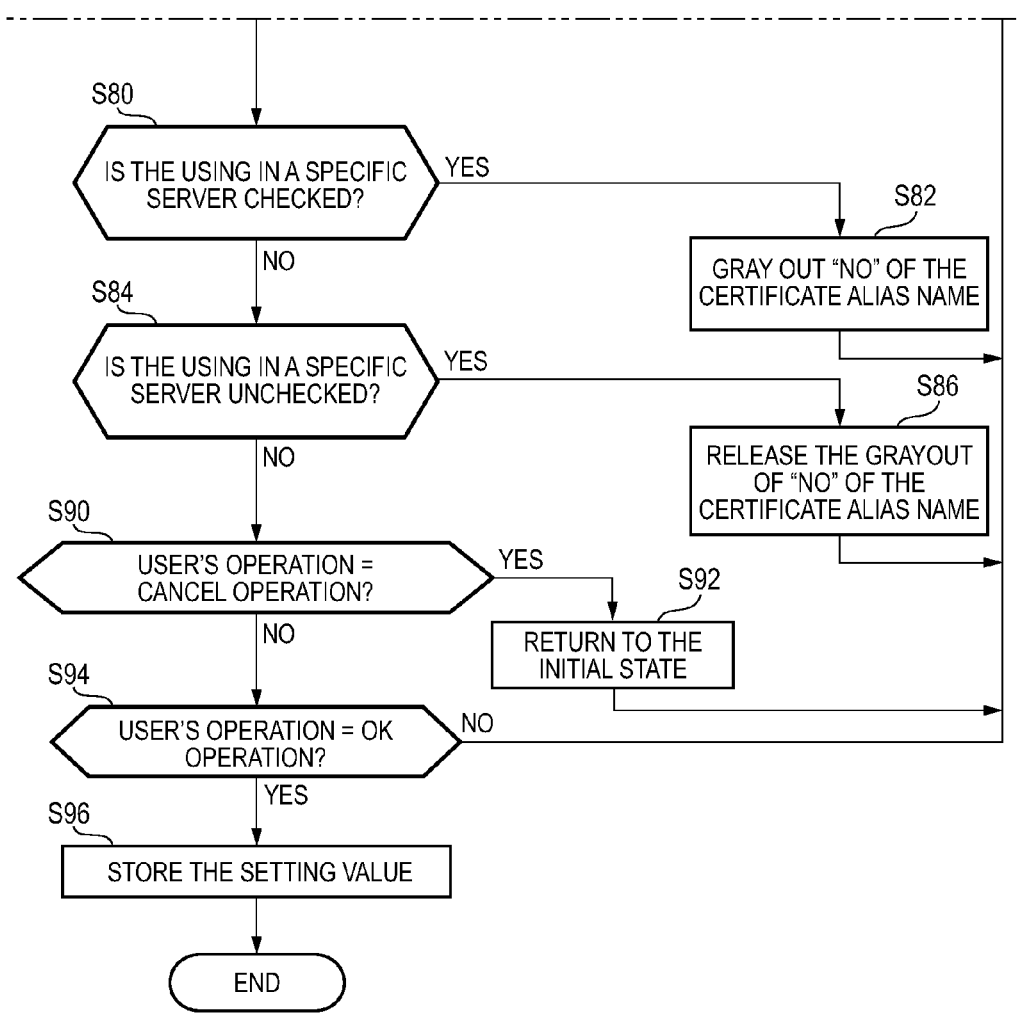

In S60 of FIG. 7, the display control unit 56 generates data, which indicates the extensions setting screen 110 in which the respective selection columns (check columns) 112, 112b, 114a to 114d and 116a to 116c are checked or unchecked, in accordance with the flags that are stored in the memory 32 in the operation information acquiring process (refer to FIG. 6). Accordingly, when the flag indicating "certificate authority=Private" and the flag indicating "Email contents protection=ON" are stored in the memory 32 in S32 of FIG. 6, for example, the display control unit 56 generates data, which indicates the extensions setting screen 110 in which the radio button 112a and the check box 114a are checked, in S60 of FIG. 7. In this case, the display control unit 56 further generates data, which indicates the extensions setting screen 110 in which the selection of the check box 114c is prohibited (i.e., the check box 114c is at a grayout state).

When the flag indicating "certificate authority=Private" and the flag indicating "device connection authentication=ON" are stored in the memory 32 in S36 of FIG. 6, the display control unit 56 generates data, which indicates the extensions setting screen 110 in which the radio button 112a and the check box 114b are checked, in S60 of FIG. 7. In this case, the display control unit 56 further generates data, which indicates the extensions setting screen 110 in which the selection of the check box 114c is permitted.

When the flag indicating "certificate authority=Private" and the flag indicating "IPP and Web communication protection=ON" are stored in the memory 32 in S40 of FIG. 6, the display control unit 56 generates data, which indicates the extensions setting screen 110 in which the radio button 112a and the check box 114a are checked and the selection of the check box 114c is prohibited (i.e., the check box 114c is at a grayout state).

When the flag indicating "certificate authority=Public" is stored in the memory 32 in S42 of FIG. 6, the display control unit 56 generates data, which indicates the extensions setting screen 110 (i.e., the extensions setting screen 110 of FIG. 8) in which the radio button 112b is checked. In this case, the display control unit 56 further generates data, which indicates the extensions setting screen 110 in which the selection of each check column of the usage selection unit 114 and the alias name selection unit 116 is prohibited (i.e., each column is at a grayout state).

In S60, the display control unit 56 further transmits the generated data to the terminal apparatus 60. As a result, the terminal apparatus 60 displays the extensions setting screen 110 relating to the data acquired from the multi-function device 10 on the display unit 62. As a result, when the extensions setting screen 110 is displayed through the mail setting screen 130, for example, the extensions setting screen 110 in which the check box 114a is checked is displayed. Likewise, when the extensions setting screen 110 is displayed through the device connection authentication screen or IPP and Web setting screen, for example, the extensions setting screen 110 in which the check box 114b or 114d is checked is displayed. Since the extensions setting screen 110 in which the check box related to the function corresponding to the setting screen is checked is displayed, the user does not have to re-check the check box. In other words, it is possible to reduce an operation burden of the user. Accordingly, when the user performs the operation for making out a CSR while performing the mail setting in the mail setting screen 130, for example, it is possible to acquire the CSR having a purpose of the 'email contents protection' that the user seriously desires without re-checking the check box 114a in the extensions setting screen 110 that is displayed in S60.

When the process of S60 is completed, the display control unit 56 monitors whether the operation information is received from the terminal apparatus 60 (S62, S70, S80, S84, S90, S94). When the operation information indicates the operation on the certificate authority selection unit 112, the display control unit 56 determines that a result of the determination in S62 is YES. When a result of the determination in S62 is YES, the display control unit 56 determines whether the operation information indicates the operation of selecting the Private certificate authority (S64). Specifically, in S64, the display control unit 56 determines YES when the operation information indicates the operation of checking the radio button 112a, whereas the display control unit 56 determines NO when the operation information indicates the operation of checking the radio button 112b. When a result of the determination in S64 is YES, the display control unit 56 generates data, which indicates a new extensions selection screen 110 (i.e., the extensions selection screen 110 of FIG. 9) in which the grayout of the respective check columns 114a to 114d (except for the check column 114c) and 116a to 116c of the usage selection unit 114 and the alias name selection unit 116 is released, and transmits the data to the terminal apparatus 60 (S66). On the other hand, when a result of the determination in S64 is NO, the display control unit 56 generates data, which indicates a new extensions selection screen 110 in which the respective check columns 114a to 114d and 116a to 116c of the usage selection unit 114 and the alias name selection unit 116 are grayed out, and transmits the data to the terminal apparatus 60 (S68). As a result, the new extensions selection screen 110 is displayed on the display unit 62.

When the operation information indicates the operation on the usage selection unit 114, the display control unit 56 determines YES in S70. Specifically, when the operation information indicates the check or uncheck operation on the check boxes 114a, 114b, 114d, the display control unit 56 determines YES. When a result of the determination in S70 is YES, the display control unit 56 determines whether the operation information indicates the operation of checking the check box 114b (S72). When a result of the determination in S72 is YES, the display control unit 56 generates data, which indicates the new extensions setting screen 110 in which the grayout of the check box 114c is released, and transmits the data to the terminal apparatus 60 (S74). On the other hand, when a result of the determination is NO, the display control unit 56 determines whether the operation information indicates the operation of unchecking the check box 114b (S76). When a result of the determination in S76 is YES, the display control unit 56 generates data, which indicates a new extensions setting screen 110 in which the check box 114c is grayed out, and transmits the data to the terminal apparatus 60 (S78). On the other hand, when a result of the determination in S74 and S76 is NO, it means that the operation information indicates the operation on the check boxes 114a, 114d. In this case, the display control unit 56 does not generate data that indicates a new extensions setting screen 110. As a result of the processes of S74 and S78, the new extensions setting screen 110 is displayed on the display unit 62.

When the operation information indicates the operation of checking the check box 114c, the display control unit 56 determines YES in S80. When a result of the determination in S80 is YES, the display control unit 56 generates data, which indicates a new extensions setting screen 110 in which the radio button 116a of the alias name selection unit 116 is grayed out, and transmits the data to the terminal apparatus 60 (S82). As a result, the new extensions setting screen 110 is displayed on the display unit 62.

When the operation information indicates the operation of unchecking the check box 114c, the display control unit 56 determines YES in S84. When a result of the determination in S84 is YES, the display control unit 56 generates data, which indicates a new extensions setting screen 110 in which the grayout of the radio button 116a of the alias name selection unit 116 is released, and transmits the data to the terminal apparatus 60 (S86). As a result, the new extensions setting screen 110 is displayed on the display unit 62.

Incidentally, as described above, the Public certificate authority 80 cannot make out a certificate based on the first type CSR including the extensions. Accordingly, when the radio button 112b corresponding to the Public certificate authority 80 and the check columns of the respective selection units 114, 116 for specifying the information to be included in the extensions are selected at the same time, the selection contents are inconsistent with each other. According to this exemplary embodiment, as shown in S68 of FIG. 7, when the user selects the radio button 112b, the selection of the check columns of the respective selection units 114, 116 is prohibited. Thus, it is possible to prevent the radio button 112b and the respective check columns of the selection units 114, 116 from being selected at the same time. Further, an alias name of a certificate is necessarily required so as to use the certificate in a specific server. Accordingly, when the check box 114c and the radio button 116a are selected at the same time, the selection contents conflict with each other. According to this exemplary embodiment, as shown in S82 of FIG. 7, when the user checks the check box 114c, the selection of the radio button 116a is prohibited. Thus, it is possible to suppress the check box 114c and the radio button 116a from being selected at the same time. As a result, the user can selectively acquire the information, which is described in the extensions, from the memory 32.

The user usually performs the selection on the respective selection units 112, 114, 116 from above in one extensions setting screen 110. According to this exemplary embodiment, it is possible to limit the selection on the selection unit (for example, selection units 114, 116) having a possibility that it will be selected later, according to a result of the selection on the selection unit (for example, selection units 112, 114) having a possibility that it will be selected first. Therefore, it is possible to avoid a user's operation of inputting unnecessary information in advance, so that it is possible to reduce an input burden of the user.

When the operation information indicates the operation on the cancel button 118, the display control unit 56 determines YES in S90. When a result of the determination in S90 is YES, the display control unit 56 transmits the data, which indicates the extensions setting screen 110 of the initial state (i.e., extensions setting screen 110 of FIG. 8), to the terminal apparatus 60 (S92). As a result, the extensions setting screen 110 of the initial state shown in FIG. 8 is displayed on the display unit 62.

When the operation information indicates the operation on the OK button 120, the display control unit 56 determines YES in S94. When the OK button 120 is operated, the control unit 66 of the terminal apparatus 60 transmits the information, which indicates the check state on the extensions setting screen 110 at the time that the OK button 120 is operated, to the multi-function device 10. Incidentally, when a character string is input in the input column 116d, the control unit 66 of the terminal apparatus 60 also transmits the character string to the multi-function device 10. The display control unit 56 stores the information (additionally, the character string) from the terminal apparatus 60 in the memory 32, as a setting value (S96). Specifically, regarding the respective check boxes 114a to 114d, the display control unit 56 stores the check state as ON and the uncheck state as OFF in the memory 32. In addition, the display control unit 56 stores the information indicating which of the radio buttons 116a to 116c is checked in the memory 32 and stores the character string, which is input in the input column 116d, in the memory 32. When the step of S96 is completed, the extensions setting process is ended. In this case, a preparation unit 52 (refer to FIG. 1) executes a CSR preparation process of S10 in FIG. 2. Incidentally, regarding the respective check columns that are included in the grayout areas on the extensions setting screen 110 at the operation time of the OK button 120, the preparation unit 52 considers the check columns unchecked irrespective of the check states of the check columns.

(CSR Preparation Process)

Figure 10:
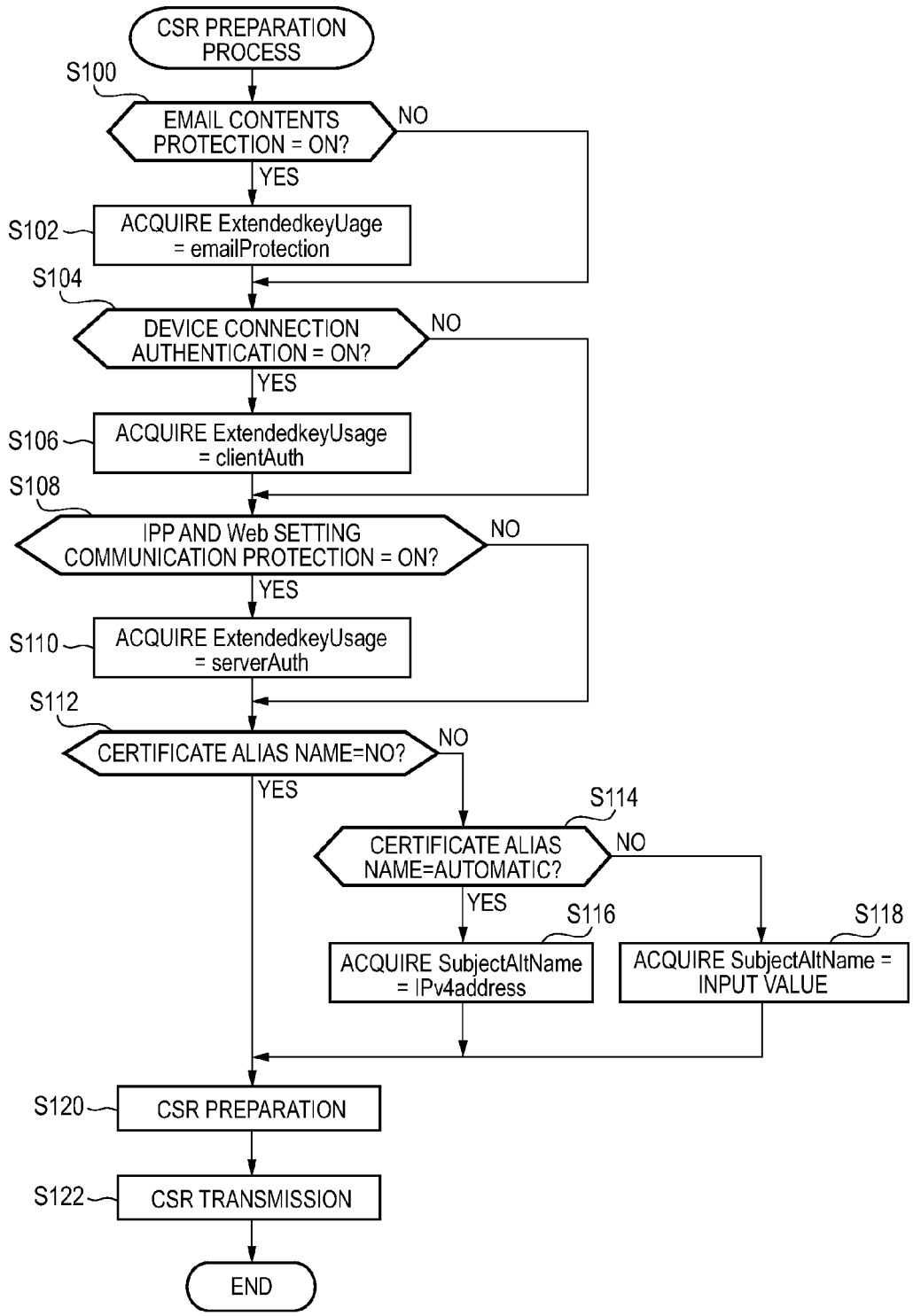
FIG. 10 shows a flow chart of a CSR preparing process.

The CSR preparation process of S10 in FIG. 2 will be described with reference to FIG. 10. The preparation unit 52 (refer to FIG. 1) first reads out the setting value that is stored in the memory 32 in S96. Then, the preparation unit 52 determines whether the check box 114a corresponding to "Email contents protection" is ON or not (S100). When a result of the determination in S100 is YES, the preparation unit 52 acquires the item name 'ExtendedKeyUsage' and the item content 'emailProtection' from the item table 36 (refer to FIG. 1) (S102).

When the step of S102 is completed or when a result of the determination in S100 is NO, the preparation unit 52 determines whether the check box 114b corresponding to the 'device connection authentication' is ON or not (S104). When a result of the determination in S104 is YES, the preparation unit 52 acquires the item name 'ExtendedKeyUsage' and the item content 'clientAuth' from the item table 36 (S106).

When the step of S106 is completed or when a result of the determination in S104 is NO, the preparation unit 52 determines whether the check box 114d corresponding to the 'IPP and Web setting communication protection' is ON or not (S108). When a result of the determination in S108 is YES, the preparation unit 52 acquires the item name 'ExtendedKeyUsage' and the item content 'clientAuth' from the item table 36 (S110).

When the step of S110 is completed or when a result of the determination in S108 is NO, the preparation unit 52 determines whether the radio button 116a corresponding to 'No' in the alias name selection unit 116 is checked or not (S112). When a result of the determination in S112 is YES, the preparation unit proceeds to S120. When a result of the determination in S112 is NO, the preparation unit 52 determines whether the radio button 116a corresponding to 'automatic' in the alias name selection unit 116 is checked or not (S114). When a result of the determination in S114 is YES, the preparation unit 52 acquires the item name 'SubjectAltName' and the item content 'IPv4address' from the item table 36 (S116). When a result of the determination in S114 is NO, it means that the radio button 116c corresponding to 'manual' is checked. In this case, the preparation unit 52 acquires the item name 'SubjectAltName' from the item table 36 and acquires, as the item content, the character string, which is input in the input column 116d, from the setting value of the memory 32 (S118). When the step of S116 or S118 is completed, the preparation unit proceeds to S120.

In S120, the preparation unit 52 uses the acquired information to make out a CSR. Specifically, the preparation unit 52 first prepares a basic area including the basic area information that is acquired in S4 of FIG. 2. Then, when the item names and the item contents are acquired from the memory 32 in the steps of S100 to S118, the preparation unit 52 makes out extensions in which the acquired item names and item contents are described. Then, the preparation unit 52 makes out a CSR (first type CSR) including the prepared basic area and the extensions. On the other hand, when no information is acquired from the memory 32 in the steps of S100 to S118, the preparation unit 52 does not make out extensions. In this case, the preparation unit 42 makes out a CSR (second type CSR) that includes the basic area but does not include the extensions.

Then, an output unit 54 (refer to FIG. 1) transmits the prepared CSR to the terminal apparatus 60 (S122). As a result, the CSR is displayed on the display unit 62, so that the user can confirm the content of the CSR. The user can operate the operation unit 64 of the terminal apparatus 60 to request the certificate authority to make out a certificate by using the CSR acquired from the multi-function device 10. For example, when the first type CSR is acquired from the multi-function device 10, the user can request the Private certificate authority 70 to make out a certificate. On the other hand, when the second type CSR is acquired from the multi-function device 10, the user can request the Public certificate authority 80 to make out a certificate. The certificate authority makes out a certificate based on the CSR included in the preparation request and transmits the same to the terminal apparatus 60. When the terminal apparatus 60 receives the certificate from the certificate authority, the terminal apparatus stores the certificate in a memory (not shown). The user can operate the operation unit 64 of the terminal apparatus 60 to execute an install operation for installing the certificate stored in the memory into the memory 32 of the multi-function device 10. The control unit 66 of the terminal apparatus 60 transmits the certificate to the multi-function device 10. When the control unit 22 of the multi-function device 10 receives the certificate, the control unit 22 stores (installs) the certificate in the memory 32. The multi-function device 10 can use the installed certificate to communicate with another device.

The information processing system 2 of this exemplary embodiment has been described. In this exemplary embodiment, the preparation unit 52 acquires the item name and item content that are included in the extensions from the item table 36 according to the selection result that the user performs in the extensions setting screen 110 (refer to FIGS. 8 and 9), and then the preparation unit 52 makes out the CSR (first type CSR) including the extensions in which the specific item name and the specific item content are described. According to this configuration, the information about the plurality of items that can be described in the extensions is beforehand stored in the item table 36. Accordingly, when the user performs the selection in the extensions setting screen 110, the multi-function device 10 can acquire the information relating to the selection result (i.e., item name and content) from the item table 36 even when the user does not know the content of the information in details, which can be described in the extensions, and can make out the CSR including the extensions in which the acquired information is described. Thus, since the operation burden of the user is reduced, the user can easily enable the multi-function device 10 to make out the CSR including the extensions in which the desired information is described.

The correspondence between the configuration of this exemplary embodiment and the configuration of the invention will be described. The multi-function device 10 is one example of the 'information processing apparatus.' The information that is acquired in S4 of FIG. 2 is one example of the 'specific information.' The extensions setting screen 110 of FIGS. 8 and 9 is one example of the 'selection screen.' The check boxes 114a, 114b, 114d and the radio button 116b in the extensions setting screen 110 are examples of the 'plurality of section fields.' The certificate authority section unit 112, the usage selection unit 114 and the alias name selection unit 116 in the extensions setting screen 110 are examples of the 'plurality selection field groups.' The usage selection unit 114 is one example of the 'first selection field group.' In this case, the alias name selection unit 116 is one example of the 'second field group.'

In addition, the certificate authority selection unit 112 is another example of the 'first selection field group.' In this case, the usage selection unit 114 or alias name selection unit 116 is another example of the 'second field group.' The mail setting screen 130 of FIG. 3 is one example of the 'setting screen.' The setting value that is stored in the memory 32 in S96 of FIG. 7 is one example of the 'condition for preparing the specific extensions that is determined in response to the user's instruction.'

<Modification to Exemplary Embodiments>

Modifications to the above-described exemplary embodiment will be described.

(1) In the above-described exemplary embodiment, regarding the CSR of x509v3, the first type CSR has been described as the CSR including the extensions and the second type CSR has been described as the CSR including no information in the extensions. Alternatively, the first type CSR may be a CSR of x509v3, and the second type CSR may be a CSR of x509v1 (version 1 of the x509 format) having no extensions.

(2) The certificate authority 70 may not prepare a certificate, based on the second type CSR. In other words, generally, the 'Private certificate authority' may be a certificate authority that can make out a certificate at least based on the first type CSR. In addition, the 'Public certificate authority' may be a certificate authority that cannot make out a certificate based on the first type CSR and can prepare a certificate based on the second type CSR.

(3) In the above-described exemplary embodiment, all of the mail setting screen 130 (refer to FIG. 3), the certificate setting screen 140 (refer to FIG. 4), the CSR preparation screen 100 (refer to FIG. 5) and the extensions setting screen 110 (refer to FIGS. 8 and 9) are displayed on the display unit 62 of the terminal apparatus 60. However, the respective screens may be displayed on the display unit 12 of the multi-function device 10. In such a modified embodiment, the display unit 12 of the multi-function device 10 is one example of the 'display unit.'

(4) In the above-described exemplary embodiment, the multi-function device 10 has been exemplified. Alternative to the multi-function device 10, a PC, a server, a printer, a scanner, a mobile terminal (PDA, mobile phone and the like) may be used. Each of the devices is included in the configuration of the 'information processing system.'

(5) In the above-described exemplary embodiment, the item table 36 is beforehand stored in the memory 32 by a vender of the multi-function device 10 before the multi-function device 10 is shipped out. However, a user may store the item names and contents of the information, which can be described in extensions, in the memory 32 in advance. In this case, the multi-function device 10 may make out the first type CSR including extensions in which the information stored in the memory 32 by the user is described. This modified embodiment is also included in the configuration of the 'memory in which regarding each of the plurality of items that can be described in the extensions included in the certificate signing request, the item names and the item contents are stored with being associated with each other.'

(6) In the above-described exemplary embodiment, in the extensions setting process, the display control unit 56 generates the data, which indicates the new extensions setting screen 110, and transmits the same to the terminal apparatus 60 whenever the operation information is received from the terminal apparatus 60. Alternatively, the display control unit 56 may also transmit an instruction with which the terminal apparatus 60 executes a process (for example, the processes of S62 to S94) for changing the extensions setting screen 110 in response to the user's operation when the data indicating the extensions setting screen 110 is transmitted in S60 of FIG. 7. In this case, the control unit 66 of the terminal apparatus 60 may execute the process for changing the extensions setting screen 110 in response to the instruction.

The specific exemplary embodiments of the invention have been described. However, the embodiments are exemplary and not to limit the scope of the invention. The technologies defined in the claims include the modified and changed examples to the exemplary embodiments.

In addition, the technical elements described and shown in the specification and the drawings provide the technical usefulness independently or in combination and are not limited to a combination of the claims at the time of filing this application. Further, the technologies exemplified in the specification or drawings achieve the purposes at the same time and have a technical usefulness inasmuch as one purpose is realized.

What is claimed is:

1. An information processing apparatus comprising:
    a memory that is configured to store a plurality of item names and a plurality of item contents, each of the plurality of item names being associated with at least one of the plurality of item contents, each of the plurality of item names and the at least one of the plurality of item contents being stored in association with each of a plurality of items that can be described in extensions included in a certificate signing request; and
    a processor configured to:
        transmit a certificate setting screen data to the terminal apparatus, the certificate setting screen data causing the terminal apparatus to display on the display unit a certificate setting screen;
        store a screen history data in the memory in response to transmitting certificate setting screen data, the screen history data including a history of screen data transmitted to the terminal apparatus;
        transmit a certificate signing request screen data to a terminal apparatus, the certificate signing request screen data causing the terminal apparatus to display a certificate signing request screen, which includes input columns, on a display unit;
        acquire basic area information from the terminal apparatus, wherein the basic area information represents user's input in the input columns;
        generate and transmit to the terminal apparatus extensions setting screen data in accordance with the screen history data, the extension setting screen data causing the terminal apparatus to display an extensions setting screen, which includes a plurality of selection fields, on the display unit, wherein at least part of the plurality of selection fields have already been checked in accordance with the screen history data when the extension setting screen is displayed on the display unit, the plurality of selection fields being included in one of a first selection field group and a second selection field group, the first selection field group including a plurality of transmission destinations of certificate signing request by a radio button selection of one of private and public, the private radio button being already checked if the screen history data indicates that a specific screen has been transmitted prior to the certificate setting screen data and the public radio button being already checked if the screen history data indicates that a specific screen has not been transmitted prior to the certificate screen setting screen data, wherein, according to user's selection of the private radio button or according to the selection of the private radio button being already checked in accordance with the screen history data, one or more selection fields of the second selection field group is displayed in a manner prohibiting selection;

acquire, from the memory, a specific item name and a specific item content in accordance with checked fields in the plurality of selection fields, the specific item name being one of the plurality of item names stored in the memory, the specific item content being one of the plurality of item contents stored in the memory;

generate a specific certificate signing request including basic area and specific extensions, wherein the basic area includes the acquired basic area information, and the specific extensions include the acquired specific item name and the acquired specific item content; and output the generated specific certificate signing request to the terminal apparatus.

2. The information processing apparatus according to claim 1,
wherein, according to the user's selection on the first selection field group, the processor is further configured to:
prohibit the user's selection on a part of the selection fields included in the second selection field group; and
permit the user's selection on selection fields, included in the second selection field group, other than the part of the selection fields.

3. The information processing apparatus according to claim 1,
wherein, according to the user's selection on the first selection field group, the processor is further configured to prohibit the user's selection on all selection fields included in the second selection field group.

4. The information processing apparatus according to claim 1,
wherein the extensions setting screen data causes the terminal apparatus to display on the display unit the extensions setting screen in a manner that the first selection field group is arranged above the second selection field group.

5. The information processing apparatus according to claim 1,
wherein content of the at least a part of selection fields included in the second selection field group is inconsistent with content in accordance with the user's selection on the first selection field group.

6. The information processing apparatus according to claim 1,
wherein the extension setting screen data causes the terminal apparatus to display the extension setting screen having the plurality of selection fields, other than the checked selection fields, grayed out.

7. The information processing apparatus according to claim 1 wherein the processor is configured to determine whether the screen history data includes information indicating the display of a mail setting screen and when a result of the determination is yes, store a flag indicating the certificate signing request is private.

8. The processing apparatus according to claim 7 wherein when a result of the determination is yes, store a flag indicating that email contents protection is ON.

9. The information processing apparatus according to claim 1 wherein the processor is configured to determine whether the screen history data includes information indicating the display of a device connection setting screen and when a result of the determination is yes, store a flag indicating the certificate signing request is private.

10. The processing apparatus according to claim 9 wherein when a result of the determination is yes, store a flag indicating that device connection authentication is ON.

11. The information processing apparatus according to claim 1 wherein the processor is configured to determine whether the screen history data includes information indicating the display of a IPP and WEB setting screen and when a result of the determination is yes, store a flag indicating the certificate signing request is private.

12. The processing apparatus according to claim 11 wherein when a result of the determination is yes, store a flag indicating that IPP and WEB setting communication protection is ON.

13. A non-transitory computer-readable medium having a computer program stored thereon and is readable by a computer provided in an information processing apparatus, said computer program, when executed by the computer, causes the image processing apparatus to perform operations comprising:

transmitting a certificate setting screen data to the terminal apparatus, the certificate setting screen data causing the terminal apparatus to display on the display unit a certificate setting screen;

storing a screen history data in the memory in response to transmitting certificate setting screen data, the screen history data including a history of screen data transmitted to the terminal apparatus;

transmitting a certificate signing request screen data to a terminal apparatus, the certificate signing request screen data causing the terminal apparatus to display a certificate signing request screen, which includes input columns, on a display unit;

acquiring basic area information from the terminal apparatus, wherein the basic area information represents user's input in the input columns;

generating and transmitting to the terminal apparatus extensions setting screen data in accordance with the screen history data, the extensions setting screen data causing the terminal apparatus to display an extensions setting screen, which includes a plurality of selection fields, on the display unit, wherein at least part of the plurality of selection fields have already been checked in accordance with the screen history data when the extension setting screen is displayed on the display unit, the plurality of selection fields being included in one of a first selection field group and a second selection field group, the first selection field group including a plurality of transmission destinations of certificate signing request by a radio button selection of one of private and public, the private radio button being already checked if the screen history data indicates that a specific screen has been transmitted prior to the certificate setting screen data and the public radio button being already checked if the screen history data indicates that a specific screen has not been transmitted prior to the certificate setting screen data, wherein, according to user's selection of the private radio button or according to the selection of the private radio button being already checked in accordance with the screen history data, one or more selection fields of the second selection field group is displayed in a manner prohibiting selection;

acquiring, from the memory, a specific item name and a specific item content in accordance with checked fields in the plurality of selection fields, the specific item name being one of a plurality of item names stored in a memory, the specific item content being one of a plurality of item contents stored in the memory;

generating a specific certificate signing request including basic area and specific extensions, wherein the basic area represents the acquired basic area information, and the specific extensions represent the acquired specific item name and the acquired specific item content; and outputting the generated specific certificate signing request to the terminal apparatus.

14. The information processing apparatus according to claim 1, wherein the processor is further configured to:

transmit the main screen data to the terminal apparatus, the main screen data causing the terminal apparatus to display the main screen on the display unit including a first link and a second link;

transmit the certificate screen data to the terminal apparatus in response to activation of the first link in the main screen, the certificate screen data causing the terminal apparatus to display on the display unit a secondary screen, including a third link;

transmit a certificate setting screen data to the terminal apparatus in response to activation of the third link in the secondary screen, the certificate setting screen data causing the terminal apparatus to display on the display unit the certificate setting screen; and transmit the certificate setting screen data to the terminal apparatus in response to activation of the second link in the main screen, the certificate setting screen data causing the terminal apparatus to display on the display unit the certificate setting screen.

15. The information processing apparatus according to claim 14, wherein the certificate setting screen data further cause the terminal apparatus to display the certificate setting screen including a fourth link, and wherein the processor is further configured to:

transmit the certificate signing request screen data to the terminal apparatus in response to activation of the fourth link in the certificate setting screen, the certificate signing request screen data causing the terminal apparatus to display on the display unit a certificate signing request screen including the input columns.

16. The information processing apparatus according to claim 14, wherein the extension setting screen data causes the terminal apparatus to display the extension setting screen having the plurality of selection fields all grayed out when the screen history data indicates that the certificate screen data is not transmitted to the terminal apparatus before transmitting the certificate setting screen data to the terminal apparatus.

17. The non-transitory computer-readable medium according to claim 13 wherein the operations include determining whether the screen history data includes information indicating the display of a device connection setting screen and when a result of the determination is yes, storing a flag indicating the certificate signing request is private.

18. The non-transitory computer-readable medium according to claim 17 wherein when a result of the determination is yes, storing a flag indicating that device connection authentication is ON.

19. The non-transitory computer-readable medium according to claim 13 wherein the operations include determining whether the screen history data includes information indicating the display of a IPP and WEB setting screen and when a result of the determination is yes, storing a flag indicating the certificate signing request is private.

20. The non-transitory computer-readable medium according to claim 19 wherein when a result of the determination is yes, storing a flag indicating that IPP and WEB setting communication protection is ON.

21. The non-transitory computer-readable medium according to claim 13 wherein the operations include determining whether the screen history data includes information indicating the display of a mail setting screen and when a result of the determination is yes, storing a flag indicating the certificate signing request is private.

22. The non-transitory computer-readable medium according to claim 21 wherein when a result of the determination is yes, storing a flag indicating that email contents protection is ON.

* * * * *